No. 659,613. Patented Oct. 9, 1900.
G. WEISS.
MOLDING MACHINE.
(Application filed Feb. 3, 1900.)

(No Model.) 2 Sheets—Sheet 1.

WITNESSES:

INVENTOR
George Weiss.
BY Geo. E. Waldo,
ATTORNEY.

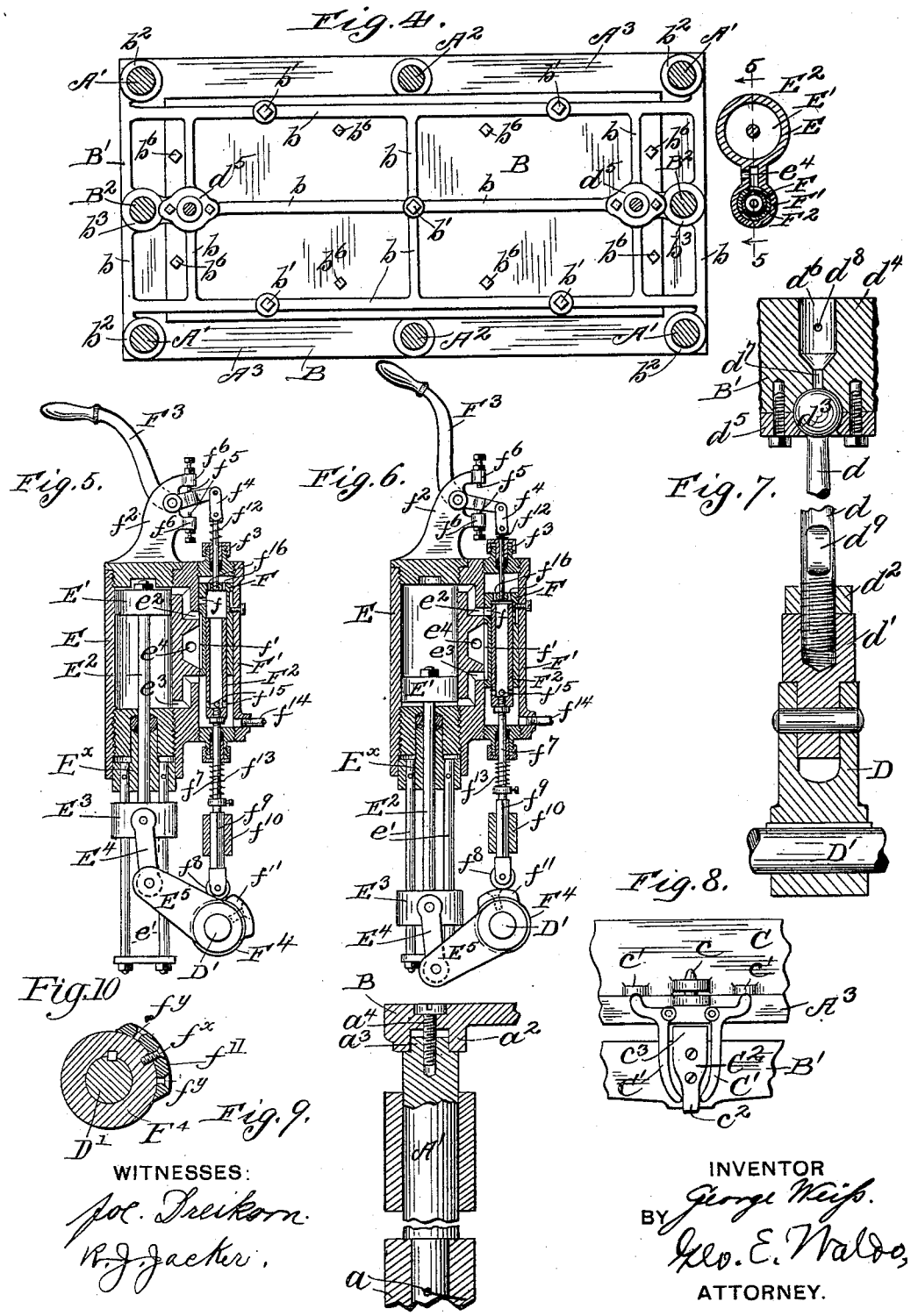

UNITED STATES PATENT OFFICE.

GEORGE WEISS, OF CHICAGO, ILLINOIS.

MOLDING-MACHINE.

SPECIFICATION forming part of Letters Patent No. 659,613, dated October 9, 1900.

Application filed February 3, 1900. Serial No. 3,788. (No model.)

*To all whom it may concern:*

Be it known that I, GEORGE WEISS, a citizen of the United States, and a resident of Chicago, in the county of Cook and State of Illinois, have invented an Improved Molding-Machine, of which the following is a specification.

This invention relates to molding-machines, and has for its object to provide a molding-machine primarily designed to be operated by power, but also adapted to be operated by hand and which shall combine the features of simplicity of construction with relative cheapness of manufacture, great strength, and efficiency.

The invention consists of the various features, combinations of features, and details of construction hereinafter described and claimed.

In the accompanying drawings a molding-machine of my invention is fully illustrated.

Figure 1 is a side elevation of my improved molding-machine, portions of the foundation and portions of the frame being shown in section to better show the operative parts thereof. Fig. 2 is an end view thereof, likewise showing a portion of the frame in section. Fig. 3 is a transverse vertical sectional view thereof on the line 3 3 of Fig. 1. Fig. 4 is a plan section on the line 4 4 of Fig. 1, looking in the direction indicated by the arrows. Figs. 5 and 6 are vertical sectional views of the power-cylinder on the line 5 5 of Fig. 4, showing the position and relation of parts when the piston is at opposite ends of its stroke; and Figs. 7, 8, 9, and 10 are enlarged detail views of parts of the machine.

The frame of my improved molding-machine consists of a suitable supporting-base A, in which are secured upright rods or standards $A'$ $A^2$, on which the stripper-plate $A^3$ is supported. As shown, said supporting-base consists of frame-sections $A^4$ $A^5$, rigidly bolted together. As shown, also, said rods or standards $A'$ $A^2$ are rigidly secured in upright bosses $a$, formed integral with the frame-sections $A^4$, the lower ends of said bosses forming feet upon which said machine-frame rests. A suitable solid foundation $A^6$, of timber or masonry, is preferably provided for said machine to rest upon, the space within said foundation being open to receive certain parts of the machine, as will appear from an inspection of Figs. 1, 2, and 3 of the drawings. Preferably, also, the foundation $A^6$ will be laid so that the top thereof will coincide with the floor-line; but this is not essential.

The stripper-plate $A^3$ may be secured to the supporting rods or standards $A'$ $A^2$ in any desired manner. As shown, said stripper-plate is provided on its under side with bosses $a^2$, suitable holes in which are fitted to the reduced upper ends $a^3$ of said rods or standards $A'$ $A^2$, and is secured to said rods or standards by means of screws $a^4$, which pass through said stripper-plate and are threaded into the ends of said rods or standards, all as clearly shown in Fig. 9 of the drawings. The lower ends of the bosses $a^2$ rest upon the shoulders formed by reducing the upper ends of the rods or standards $A'$ $A^2$, which thus operate to maintain said stripper-plate in fixed vertical adjustment.

While I have shown but four rods or standards $A'$ and two rods or standards $A^2$, it will be understood that these, and particularly the rods or standards $A^2$, may be increased or decreased as necessary to give desired support or rigidity to the stripper-plate.

The pattern-plate B is carried on a suitable head or frame $B'$, located beneath the stripper-plate $A^3$ and movable vertically toward and from said stripper-plate on suitable guides. As shown, the head or frame $B'$, which carries said pattern-plate B, is a skeleton structure consisting of webs $b$, preferably formed integral with each other, as clearly shown in Fig. 4, the pattern-plate B being detachably secured to said head or frame $B'$ by means of screws $b'$, which pass through holes formed in bosses on said head or frame $B'$ in proper position and are threaded into said pattern-plate in the usual manner, thus making provision for conveniently changing the pattern when desired.

As shown, the guides for the head or frame $B'$ in its movement toward and from the stripper-plate $A^3$ are formed by the upright rods or standards $A'$, to which are fitted suitable bearings in bosses $b^2$ on said head or frame $B'$, said bosses being sufficiently long to form, in effect, sleeves which will effectually prevent them from binding or cramping upon said rods or standards $A'$. In the preferable construction shown, also, additional guides are provided for said head or frame B', consisting of rods or plungers B², secured in suitable bosses $b^3$ on said head or frame, said rods or plungers B² being fitted to and longitudinally movable in suitable bearings formed in bosses $b^4$ on the base A of the machine-frame. The lower ends of the bearings in said bosses $b^4$ are closed, and I therefore provide vent holes or openings $b^5$ therefor, which will effectually prevent the formation of vacuums beneath said rods or plungers B² as the frame or head B' is raised and the compression of air in said bearings as said head or frame descends, either of which might prevent or seriously interfere with the proper operation of the machine.

B³ represents a pattern supported in operative position on the pattern-plate B. As shown, said pattern B³ is detachably secured to said pattern-plate by screws $b^6$, which pass through holes in said pattern-plate and are threaded into said pattern in a familiar manner.

In order to stop the head or frame B' and the parts carried thereon gradually as they approach the limit of their downward movement, and thus relieve the various parts of the machine from the shock and strain due to the too-rapid descent and sudden stopping thereof, suitable buffers are provided beneath said head or frame. As shown, said buffers consist of coiled springs $b^7$, inserted between the bosses $b^3$ on said head or frame and the bosses $b^4$ on the machine-frame and around the rods or plungers B², which thus act as guides to maintain said springs $b^7$ in position. As illustrated, a section C of a flask, either the drag or the cope, is supported upon the stripper-plate A³, being maintained in operative adjustment thereon by dowel-pins $c$ in the usual manner.

As preferably constructed, my improved machine comprises means for slightly raising the section of flask C as the head or frame B' descends, breaking the adhesion between said section of flask and the stripper-plate, thus facilitating the removal of said section of flask. As shown, the means for so raising said section of flask are as follows, particular reference being had to Fig. 8 of the drawings: Pivoted upon the stripper-plate A³ are bell-cranks C', the upper ends of which are directly beneath lugs $c'$ on the section of flask C. The lower ends of said bell-cranks C' project into the path of travel of cam-plates C² on the movable head or frame B', said cam-plates C² being preferably of such lengths that they will be between said lower ends of said bell-cranks at all points in the travel of said head or frame B'. The lower ends $c^2$ of the cam-plates C² are relatively narrow to permit the upper ends of said bell-cranks to be depressed sufficiently to allow the section of flask C to rest in contact with the stripper-plate A³. The upper ends $c^3$ of said cam-plates C² are made wider than the lower ends $c^2$ thereof, so that as the head or frame B' descends, bringing the lower ends of the bell-cranks C' into engagement therewith, said lower ends of said bell-cranks will be forced outwardly, correspondingly raising the upper ends thereof, which, contacting with the under surfaces of the lugs $c'$ on the section of flask C, will operate in an obvious manner to raise said section of flask C in the manner desired, in which raised position it will be maintained until said head or frame B' is again raised. The operative surfaces of the portions $c^2 c^3$ of said cam-plates C² merge into each other on gradual curves, as clearly shown.

The head or frame B', carrying the pattern-plate B and the pattern B³, is raised and lowered by means of cranks D, secured to a central shaft D', revolubly mounted adjacent to the bottom of the machine in suitable bearings formed in the sections A⁵ of the machine-frame. The cranks D are connected to the frame B' by connecting-rods or pitmen D², which are pivotally connected to said cranks and to said head or frame.

In the preferable construction shown (see particularly Fig. 7) the pitmen D² are made in two sections $d\, d'$, of which the sections $d$ are threaded into the sections $d'$ and are provided with lock-nuts $d^2$, whereby said sections $d\, d'$ may be secured in any adjusted positions. Preferably, also, the sections $d$ of said pitmen D² are connected to the head or frame by a ball-and-socket joint, thus making provision for screwing said sections $d$ of said pitmen into or out of the sections $d'$ thereof. As shown, the ball-and-socket connections between said pitmen D² and the head or frame B' consist of balls $d^3$, formed on the ends of the sections $d$ of said pitmen, which are fitted to suitable sockets formed in bosses $d^4$ on said head or frame, in which they are secured by means of caps $d^5$, bolted to said bosses. Provision for lubricating said ball-and-socket joints is made as follows: Cups or reservoirs $d^6$ are provided in the tops of the bosses $d^4$, which communicate with sockets of the bearings by suitable holes $d^7$, so that oil supplied to said cups or reservoirs will be delivered to said bearings through the holes $d^7$. The cups or reservoirs $d^6$ will preferably be packed with waste or the like, and oil may be supplied thereto when desired through lateral oil-holes $d^8$ in the bosses $d^4$.

By means of the described construction of the pitmen D² and their described connection with the head or frame B' it is obvious that said pitmen may be lengthened or shortened within limits, thus affording very convenient means for quickly and accurately regulating the extreme raised position of the head or frame B' when necessary to adjust the parting-line of the flask. To provide for conveniently turning the sections $d$ of the pitmen D², they are provided on their opposite sides with flattened surfaces $d^9$, adapted to be engaged by a wrench.

The pitmen $D^2$ will preferably be adjusted to such lengths that the head or frame $B'$ will be in position to bring the pattern thereon in proper vertical adjustment when the cranks D are at the limits of their throw—that is, when said cranks are on dead-centers. To prevent the cranks D from carrying by their dead-points, rigid stops $d^{10}$, Fig. 3, are provided on the machine-frame in the paths of travel of said cranks, which operate to limit the movement of said cranks in the desired manner.

While I have herein shown two crank-and-pitmen connections between the shaft $D'$ and the head or frame $B'$, it will be understood that they may be increased as desired to meet requirements, or in the case of a small machine a single crank or pitman may be used.

It is obvious that oscillation of the shaft $D'$ and cranks D will operate to raise and lower the head or frame $B'$ and the parts carried thereon.

My improved machine is designed to be operated, primarily, by power, and I will now describe said operating mechanism.

Rigidly supported in proper position is a cylinder E. In the preferable construction shown said cylinder E is supported upon the base A of the machine-frame by means of a bracket $e$, formed integral with said cylinder and bolted to said base A of said machine-frame. Fitted to said cylinder is a piston $E'$, in which is secured a piston-rod $E^2$, the outer end of which is secured in a cross-head $E^3$, which is longitudinally movable on guide-rods $e'$, secured in the packing-gland $E^\times$ of the lower cylinder-head, said cross-head $E^3$ being provided with suitable bearings to engage said rods. Links $E^4$ connect said cross-head $E^3$ with cranks $E^5$, secured to the actuating-shaft $D'$ of the machine. Movement of said piston $E'$ will thus operate to rotate said shaft $D'$, and thus to raise and lower the head or frame $B'$.

Referring now particularly to Figs. 5 and 6, the cylinder E is provided with usual admission and exhaust ports $e^2$, $e^3$, and $e^4$, which are controlled, primarily, by a main valve F, which, as shown, is cylindrical and hollow and is fitted to and longitudinally movable in a suitable cylindrical bore or seat in the valve-chest $F'$. Said main valve F is provided with an opening $f$, which communicates with the interior thereof and is adapted to be brought into register with the port $e^2$ by proper movement of said valve. Said valve is also provided with a cut-away portion $f'$, which is in continuous communication with the exhaust-port $e^4$ and is adapted to be brought alternately into communication with the ports $e^2$ $e^3$. The port or opening $f$ in the main valve F is controlled by means of a secondary valve $F^2$, which also consists of a hollow cylinder fitted to and longitudinally movable in a suitable bore or seat in the main valve F. The main valve F is operated by means of a hand-lever $F^3$, pivoted upon a bracket $f^2$ on the upper head of the cylinder E. The connection between said hand-lever $F^3$ and said main valve F comprises a stem or rod $f^3$, secured in said main valve F, and links $f^4$, which connect said stem or rod $f^3$ with said hand-lever $F^3$. The movement of the main valve F is limited by suitable stops adapted to arrest movement thereof when one or the other of the ports $e^2$ $e^3$ is open. As shown, said stops are applied directly to the hand-lever $F^3$ and consist, preferably, of screws $f^5$, threaded through lugs $f^6$ on the bracket $f^2$, above and below said lever $F^3$ and in its path of travel. Said screws $f^5$ thus form adjustable stops whereby the extreme positions of the main valve F may be regulated to produce desired openings of the admission-ports $e^2$ $e^3$, thus regulating the speed with which the head or frame $B'$ is raised and lowered, as desired. The secondary valve $F^2$ is operated automatically by means of a rod or stem $f^7$, the lower end of which rides or rests upon a cam $F^4$, formed on the perimeter of the hub of the cranks $E^5$, the configuration and adjustment of said cam being such that said secondary valve will be raised to close the port or opening $f$ in the main valve F, thus closing the admission-port $e^2$ at a desired point in the descent of the head or frame $B'$, and will be lowered again as said frame approaches the upper limit of its movement, so that said port or opening $f$ may be brought into register with the port $e^2$ and will not be covered by said secondary valve $F^2$ when it is again desired to lower said head or frame $B'$. An antifriction-roller $f^8$ is preferably mounted at the lower end of the valve-stem $f^7$, which bears upon said cam, and said stem is provided with a squared section $f^9$, which engages a square bearing or socket formed in a bracket $f^{10}$ on the main frame of the machine. In the preferable construction shown the raised portion of the cam $F^4$ is formed on a block $f^{11}$, secured to the hub of the cranks $E^5$, so as to be adjustable circumferentially thereof, thus providing means for regulating the raising and lowering of the secondary valve $F^2$. As shown, said block $f^{11}$ is secured to said crank-hub by a flush head-screw $f^\times$, threaded into said crank-hub, said screw being interchangeable in a series of suitable holes $f^y$ in said block $f^{11}$. As shown, springs $f^{12}$ $f^{13}$ are applied to the main and secondary valves F $F^2$, respectively, which operate in an obvious manner, the spring $f^{12}$ to counterbalance the weight of the main valve F and the spring $f^{13}$ to supplement the action of gravity to depress the secondary valve $F^2$ when the roller $f^8$ runs off from the raised portion of the cam $F^4$ onto the lower portion thereof.

Fluid under pressure to operate the machine is admitted to the valve-chest $F'$, below the valves F $F^2$, through a pipe $f^{14}$, which communicates with any suitable source of supply, (not shown,) whence it passes directly into the cylinder below the piston, the port $e^3$ being open, as shown in Fig. 5, or into the interiors of the valves F F² through openings $f^{15}$ in the secondary valve F², and thence into the cylinder above the piston, the port or opening $f$ being in register with the port $e^2$ and the secondary valve F² depressed to uncover said port or opening $f$. Said operating fluid is also admitted to the space in the valve-chest above the valves F F² through openings $f^{16}$ in the end of the main valve F to equalize the pressure thereof on the lower end of said valves.

In practice I prefer to use compressed air for operating my improved machine; but I contemplate the use of steam, water, or the like, if desired.

I will now describe the operation of my improved machine, starting with the head or frame B' in raised position, as shown in Figs. 1, 2, and 3 of the drawings, in which position the piston will be at the upper end of its stroke and the valves F F² in the positions shown in Fig. 5. It being desired to lower the head or frame B', the hand-lever F³ is moved to depress the main valve F into the position shown in Fig. 6, the secondary valve remaining temporarily in the position shown in Fig. 5, thus bringing the opening $f$ into register with the port $e^2$ and opening said port and at the same time bringing the port $e^3$ into communication with the exhaust-port $e^4$. With the valves in this position the operating fluid will be admitted above the piston, forcing down said piston and also the head or frame B' through the described connection between said piston and said head or frame. At a predetermined point in the descent of the head or frame B' the roller $f^8$ will run onto the raised portion of the cam F⁴, as in Fig. 6, raising the secondary valve F² and closing the opening $f$ and the port $e^2$, after which the pressure in said cylinder will gradually descrease, thus enabling the buffer-springs $b^7$ to bring the head or frame B' to rest in lowered position gradually and without any shock or jar. When it is again desired to raise the head or frame B', the hand-lever F³ is moved to bring the main valve F into the position shown in Fig. 5, opening the port $e^3$, closing the port $e^2$, and bringing said port $e^2$ into communication with the exhaust-port $e^4$. The secondary valve F² will remain in the position shown in Fig. 6 until the roller $f^8$ runs off from the high portion of the cam F⁴, when it will fall to the position shown in Fig. 5, in which position it will remain until the head or frame B' is fully raised. This cycle is repeated indefinitely, the molds being formed in the usual way. By means of the hand-lever F³ the main valve F is at all times under the complete control of the operator, so that the admission-port to either end of the cylinder may be opened a desired distance to cause the head or frame B' to be raised or lowered with desired speed.

While, as hereinbefore stated, my improved machine is primarily designed to be operated by power, I also contemplate its operation by hand. To effect this end, a socket is provided in the hub of the cranks E⁵, adapted to be engaged by a hand-lever G. As shown, said soocket is formed in an extension of the hub of said cranks E⁵, which projects beyond the end of the shaft D', and to facilitate finishing said socket the end of said hub is cut away, as shown at $g$, Fig. 2, thus allowing convenient access to said socket with a suitable tool.

While the machine herein shown is rectangular in shape, I desire it to be understood that the shape of said machine is immaterial, my improvements admitting embodiment in a machine of any desired shape, as round or square.

I claim—

1. In a molding-machine, the combination of a supporting-base, upright rods or standards secured therein, a stripper-plate supported on said rods or standards, a pattern-carrying head or frame movable toward and from said stripper-plate, guides for said head or frame, said guides comprising a plurality of the stripper-plate-supporting rods or standards, said head or frame being provided with bearings fitted to said rods or standards and said guides comprising, also, rods or plungers secured in said head or frame, said rods or plungers being fitted to and longitudinally movable in suitable bearings formed in the supporting-base of the machine-frame and means to impart movement to said head or frame toward and from said stripper-plate, substantially as described.

2. In a molding-machine, the combination with a stripper-plate, a pattern-carrying head movable toward and from said stripper-plate and means to impart movement to said pattern-carrying head or frame toward and from said stripper-plate, of bell-cranks pivoted upon said stripper-plate and cam-plates secured to said pattern-carrying head or frame, the lower ends of said bell-cranks projecting into the path of travel of said cam-plates so that said bell-cranks will be moved pivotally so as to raise the upper ends thereof, as said pattern-carrying head or frame descends, thereby causing said upper ends of said bell-cranks to contact with rigid portions of a section of flask supported in operative adjustment on said stripper-plate and to raise said section of flask, substantially as described.

3. In a molding-machine, the combination with a stripper-plate, a pattern-carrying head or frame movable toward and from said stripper-plate, an actuating-shaft and operative connection between said shaft and said pattern-carrying head or frame, whereby rotation of said shaft will impart movement to said pattern-carrying head or frame toward and from said stripper-plate, of a cylinder and piston motor, a crank and connecting-rod connection between the cross-head of said motor and the actuating-shaft of the molding-machine, the ports of said cylinder being controlled by a valve mechanism, comprising a main valve, means, under the control of the operator, to move said valve, a secondary valve, means to impart movement thereto to close the open port to the cylinder at a predetermined point in the descent of said pattern-carrying head or frame and means to impart movement to said secondary valve, as said pattern-carrying head or frame ascends, to allow the opening of said port, substantially as described.

4. In a molding-machine, the combination with the stripper-plate, the pattern-carrying head or frame movable toward and from said stripper-plate, an actuating-shaft and operative connection between said actuating-shaft and said pattern - carrying head or frame, whereby rotation of said shaft will impart movement to said head or frame toward and from said stripper-plate, of a cylinder and piston motor, a crank and connecting-rod connection between the cross-head of said motor and the actuating-shaft of the machine, the ports of the motor-cylinder being controlled by a valve mechanism, comprising a main valve, means, under the control of the operator, to move said valve, stops to limit the movement of said valve, a secondary valve, means to impart movement to said secondary valve to close the open admission-port to the cylinder at a predetermined point in the descent of said pattern-carrying head or frame and means to move said secondary valve, as said pattern-carrying head or frame ascends, to permit said port to be opened, substantially as described.

5. In a molding-machine, the combination with the stripper-plate and the pattern-carrying head or frame, an actuating-shaft and operative connection between said actuating-shaft and said pattern-carrying head or frame, whereby rotation of said shaft will impart movement to said head or frame toward and from said stripper-plate, of a cylinder and piston motor, a crank and connecting-rod connection between the cross-head of said motor and the actuating-shaft of the machine, a valve mechanism which controls the ports of said motor-cylinder, comprising a main valve, means under the control of the operator, to move said valve, adjustable stops to limit the movement of said main valve, a secondary valve, means to impart movement to said secondary valve to close the open admission-port to the cylinder at a predetermined point in the descent of the pattern-carrying head or frame and means to move said secondary valve, as said pattern-carrying head or frame ascends, to permit said port to be opened, substantially as described.

6. In a molding-machine, the combination with the stripper-plate and the pattern-carrying head or frame, an actuating-shaft and operative connection between said actuating-shaft and said head or frame, whereby rotation of said shaft will impart movement to said head or frame toward and from said stripper-plate, of a cylinder and piston motor, a crank and connecting-rod connection between the cross-head of said motor and the actuating-shaft of the machine, a valve mechanism which controls the ports of said motor-cylinder, comprising a main valve, a hand-lever applied thereto to move the same, stop-screws which limit the movement of said hand-lever, a secondary valve, means to impart movement thereto to close the open admission-port to the cylinder at a desired point in the descent of the pattern-carrying head or frame and means to move said secondary valve, as said pattern-carrying head or frame ascends, to allow the opening of said cylinder-port, substantially as described.

7. In a molding-machine, the combination with a stripper-plate, a pattern-carrying head or frame movable toward and from said stripper-plate, an actuating-shaft and operative connection between said actuating-shaft and said pattern-carrying head or frame, whereby rotation of said shaft will impart movement to said carrying head or frame toward and from said stripper-plate, of a cylinder and piston motor, a crank and connecting - rod connection between the cross - head of said motor and the actuating-shaft of the machine, the ports of said cylinder being controlled by a valve mechanism, comprising a main valve, means, under the control of the operator, to move said valve, a secondary valve and operative connection between said secondary valve and the actuating-shaft of the machine, whereby said secondary valve will be moved to close the open port to the cylinder at a predetermined point in the descent of the pattern-carrying head or frame and to move said secondary valve, during the ascent of said pattern-carrying head or frame, to allow the opening of said port, substantially as described.

8. In a molding-machine, the combination with a stripper-plate, a pattern-carrying head or frame movable toward and from said stripper-plate, an actuating-shaft and operative connection between said actuating-shaft and said pattern-carrying head or frame, whereby rotation of said actuating-shaft will impart movement of said head toward and from said stripper-plate, of a cylinder and piston motor, a crank and connecting-rod connection between the cross-head of said motor and the actuating-shaft of the machine, a valve mechanism which controls the ports of said motor-cylinder, comprising a main valve, means, under the control of the operator, to impart movement to said valve, a secondary valve, a cam on the actuating-shaft of the machine upon which the stem of said secondary valve rides or rests and means to maintain said valve-stem in operative connection with said cam, substantially as described.

9. In a molding-machine, the combination with a stripper-plate, a pattern-carrying head or frame movable toward and from said stripper-plate, an actuating-shaft and operative connection between said actuating-shaft and said pattern-carrying head or frame, whereby rotation of said shaft will impart movement to said pattern-carrying head or frame toward and from said stripper-plate, of a cylinder and piston motor, a crank and connecting-rod connection between the cross-head of said motor and the actuating-shaft of the machine, a valve mechanism, which controls the ports of said cylinder, comprising a main valve, means, under the control of the operator, to impart movement to said main valve, a secondary valve, a cam on the actuating-shaft of the machine, upon which the stem of said valve rides or rests, said cam being adjustable circumferentially on said shaft, and means to maintain said valve-stem in operative engagement with said cam, substantially as described.

10. In a molding-machine, the combination with a stripper-plate, a pattern-carrying head or frame movable toward and from said stripper-plate, an actuating-shaft and operative connection between said actuating-shaft and said head or frame, of a cylinder and piston motor, a crank and connecting-rod connection between the motor cross-head and the actuating-shaft of the machine, a valve mechanism which controls the ports of said cylinder comprising a main valve, a hand-lever applied thereto to move the same, adjustable stops which limit the movement of said main valve, a secondary valve, a cam on the actuating-shaft of the machine upon which the stem of said secondary valve rides or rests and means to maintain said valve-stem in operative connection with said cam, substantially as described.

11. In a molding-machine, the combination with a stripper-plate, a pattern-carrying head or frame, movable toward and from said stripper-plate, an actuating-shaft and operative connection between said actuating-shaft and said pattern-carrying head or frame, of a cylinder and piston motor, a crank and connecting-rod connection between the cross-head of said motor and the actuating-shaft of the machine, a valve mechanism which controls the ports of said cylinder, comprising a hollow main valve, the interior of which is in open communication with the source of supply of fluid under pressure, a port or opening in said main valve which is adapted to be brought into register with the admission-port to that end of the cylinder, the admission of steam to which will effect depression of the pattern-carrying head or frame, means, under the control of the operator, to move said valve, a secondary valve which controls the port or opening in the main valve, means to move said secondary valve to close said port at a predetermined point in the descent of the pattern-carrying head or frame, and means to move said secondary valve, as said pattern-carrying head or frame ascends, to allow said port in said main valve to be brought into open register with said cylinder-port, substantially as described.

In testimony that I claim the foregoing as my invention I have hereunto set my hand this 29th day of January, 1900.

GEORGE WEISS.

Witnesses:
C. J. BROUGHTON,
H. W. GRIER.